(12) United States Patent
Samuel

(10) Patent No.: US 10,968,732 B2
(45) Date of Patent: Apr. 6, 2021

(54) TUBULAR WEAR VOLUME DETERMINATION USING ELASTICITY CORRECTION

(71) Applicant: Landmark Graphics Corporation, Houston, TX (US)

(72) Inventor: Robello Samuel, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 15/753,405

(22) PCT Filed: Oct. 9, 2015

(86) PCT No.: PCT/US2015/054838
§ 371 (c)(1),
(2) Date: Feb. 19, 2018

(87) PCT Pub. No.: WO2017/062024
PCT Pub. Date: Apr. 13, 2017

(65) Prior Publication Data
US 2018/0238165 A1 Aug. 23, 2018

(51) Int. Cl.
| | | |
|---|---|---|
| *E21B 47/06* | (2012.01) | |
| *E21B 47/007* | (2012.01) | |
| *E21B 47/07* | (2012.01) | |
| *G01M 5/00* | (2006.01) | |
| *E21B 47/18* | (2012.01) | |

(52) U.S. Cl.
CPC ............ *E21B 47/007* (2020.05); *E21B 47/06* (2013.01); *E21B 47/07* (2020.05); *G01M 5/0025* (2013.01); *E21B 47/18* (2013.01)

(58) Field of Classification Search
CPC .... E21B 47/0006; E21B 47/06; E21B 47/065; E21B 47/18; G01M 5/0025
USPC ...................................... 73/799, 808
See application file for complete search history.

(56) References Cited

U.S. PATENT DOCUMENTS

| | | |
|---|---|---|
| 7,114,578 B2 | 10/2006 | Hutchinson |
| 2004/0221985 A1 | 11/2004 | Hill et al. |
| 2008/0077332 A1 | 3/2008 | Newman |
| 2017/0022798 A1* | 1/2017 | Samuel .................. G01B 21/08 |

FOREIGN PATENT DOCUMENTS

| | | |
|---|---|---|
| WO | WO 2015/102633 A1 | 7/2015 |
| WO | WO 2015/152961 A1 | 10/2015 |

OTHER PUBLICATIONS

International Search Report and the Written Opinion of the International Search Authority, or the Declaration, Jul. 12, 2016, PCT/US2015/054838, 15 pages, ISA/KR.

* cited by examiner

*Primary Examiner* — Giovanna Wright
*Assistant Examiner* — Yanick A Akaragwe
(74) *Attorney, Agent, or Firm* — Haynes and Boone, LLP

(57) ABSTRACT

Tubular elasticity is applied to determine tubular wear volume. In general, a torque and drag model is applied to calculate the dynamic stretch of the inner tubular string (e.g., drill string). The dynamic stretch is then integrated into a casing wear model to improve the accuracy of the calculated wear and its corresponding position along the outer tubular string (e.g., casing string).

28 Claims, 4 Drawing Sheets

TUBULAR WEAR VOLUME DETERMINATION USING ELASTICITY CORRECTION

PRIORITY

The present application is a U.S. National Stage patent application of International Patent Application No. PCT/US2015/054838, filed on Oct. 9, 2015, the benefit of which is claimed and the disclosure of which is incorporated herein by reference in its entirety.

FIELD OF THE DISCLOSURE

The present disclosure relates generally to the field of hydrocarbon reservoirs and, more specifically, to techniques for reducing and/or eliminating casing wear during downhole operations.

BACKGROUND

To produce hydrocarbons from subterranean reservoirs, oilfield operators drill and case the borehole. When doing so, a shallow portion of the borehole may be cased to protect the water table from possible contamination by hydrocarbons and drilling fluids, whereas deeper portions of the borehole may be later cased as needed to facilitate the drilling process or completion of the well.

Each borehole is typically cased with a casing string, i.e., lengths of steel pipe threaded together and lowered into the borehole before being cemented in place. Despite being made of steel and secured by cement, casing strings can fail. Among the many factors that may contribute to casing failure is internal casing wear. The main cause of such casing wear is the frictional rubbing of other tubular strings on the inner surface of the casing string. For example, as a drill string moves and rotates inside a casing string, it rubs against the inner surface of the casing string, potentially reducing the wall thickness and thereby degrading the casing string's integrity and resistance to deformation.

Operators attempt to anticipate, and account for, casing wear when setting out suitable casing string specifications for each borehole. However, the estimation of wear volume often fails to match the actual measurements. Since these estimations are often inaccurate, they incur excess costs in two forms: overly thick casing walls due to unreasonably high safety margins, and downtime to address failures of casing integrity.

DESCRIPTION OF ILLUSTRATIVE EMBODIMENTS

Figure 1:
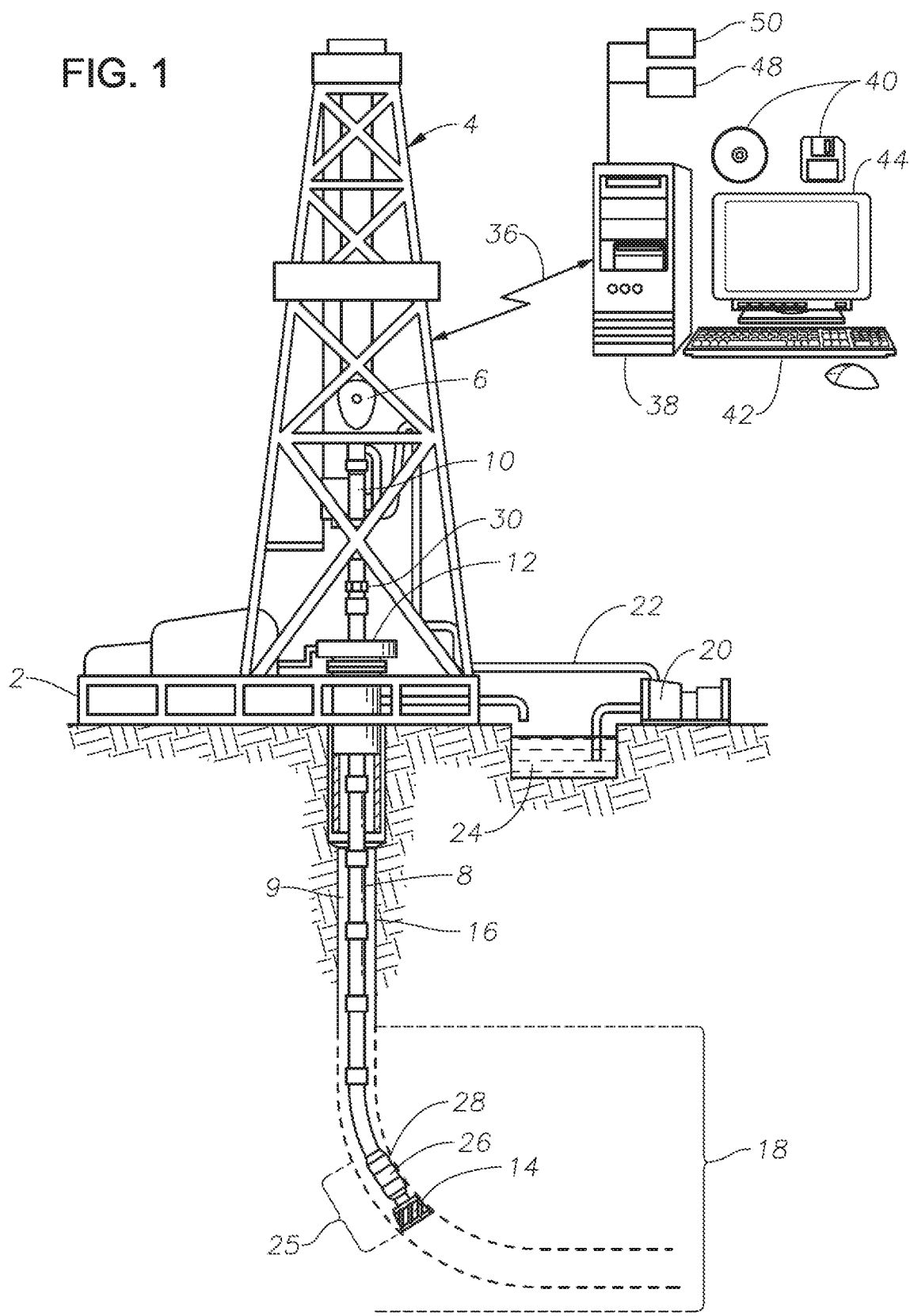
FIG. 1 shows a drilling environment in which the illustrative embodiments of the present disclosure may be practiced.

Illustrative embodiments and related methods of the present disclosure are described below as they might be employed to determine tubular wear volume while correcting for tubular elasticity. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, illustrative embodiments and methods of the present disclosure integrate tubular elasticity into a casing wear volume determination model. Elasticity is the material property that allows a tubular to dynamically elongate, thus resulting in a stretching of the tubular while it's in motion (i.e., the dynamic stretch as a function of time). Through the use of pipe elasticity, the casing wear volume is determined as the inner tubular string moves up and down during tripping and reciprocating (with or without sea wave and vessel movement). If the tubular elasticity is not accounted for when the tubular is moving, the surface velocity may not be the same as the bottomhole speed. As a result, the actual position of the tubular may not be the same as the position calculated using steady state models, thereby resulting in an inaccurate determination of casing wear volume. The methods described herein, however, remedy this deficiency by applying tubular elasticity to calculate the correct position of the tubular and the corresponding amount of casing wear.

In a generalized method, a torque and drag model is utilized to calculate the dynamic stretch of the inner tubular string (e.g., drill string), which is due to the elastic nature of the tubular material. The dynamic stretch is then integrated into a casing wear model to thereby improve the accuracy of the calculated wear and its corresponding position along the outer tubular string (e.g., casing string). This combination of models will provide a more accurate volume wear calculation based on tubular movement that is corrected for the elasticity effect. In other methods, the torque & drag models are calibrated in real-time to actual conditions within the outer tubular string using survey, temperature, pressure and downhole tool data.

Although the present disclosure is described in relation to downhole applications using cased wellbores, the methods are equally applicable to other tubular strings such as, for example, a riser or any other tubular string in which another tubular string rotates or otherwise moves inside to produce like wear effects. Those ordinarily skilled in the art having the benefit of this disclosure realize there are a variety of alternative applications for the present disclosure.

It will also be apparent those ordinarily skilled persons that the embodiments, as described herein, can be implemented in many different embodiments of software, hardware, firmware, or a combination thereof and may be implemented in one or more computer systems or other processing systems. Any actual software code used for the specialized control of hardware to implement the methods is not limited to the detailed description. Thus, the operational behavior of embodiments will be described with the understanding that modifications and variations of the embodiments are possible, given the level of detail presented herein.

FIG. 1 shows a drilling environment in which the illustrative embodiments of the present disclosure may be practiced. In FIG. 1, a drilling rig platform 2 supports a derrick 4 having a traveling block 6 for raising and lowering a drill string 8. Drill string 8 may be, for example and without limitation, a coiled tubing, additional casing or some other tubular string. A drill string kelly 10 supports the rest of drill string 8 as it is lowered through a rotary table 12. Rotary table 12 rotates drill string 8, thereby turning drill bit 14. As drill bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via annulus 9 around drill string 8, and into a retention pit 24. The drilling fluid transports cuttings from borehole 16 into retention pit 24 and aids in maintaining the integrity of borehole 16. An upper portion of the borehole 16 is cased and the lower portion is open (uncased) borehole. The casing string may be a variety of other tubulars such as, for example, a riser utilized in deep water applications.

Drill bit 14 is just one piece of an open-hole logging-while-drilling ("LWD") assembly that includes a bottom-hole assembly 25 having one or more drill collars 26 and logging tool 28. Drill collars 26 are thick-walled steel pipe sections that provide weight and rigidity for the drilling process. Logging tool 28, which may be integrated into one of the drill collars, gathers measurements of various drilling or formation parameters. Illustrative drilling parameters include weight on bit, torque, and rate of penetration.

Measurements from logging tool 28 can be acquired by a telemetry sub (e.g., integrated with logging tool 28) to be stored in internal memory and/or communicated to the surface via a communications link. Mud pulse telemetry is one technique for providing a communications link for transferring logging measurements to a surface receiver 30 and for receiving commands from the surface, but other telemetry techniques can also be used. In accordance with at least some embodiments, measurements collected from logging tool 28 are processed by a computer 38 to produce one or more well logs for analysis. The contemplated logs include, for example, a tubular string wear log (e.g., casing string wear volume log).

The telemetry signals are supplied via a communications link 36 to the computer 38 or some other form of a data processing device. Computer 38 may include or be coupled to a non-transitory computer-readable medium (e.g., a hard-disk drive and/or memory) ("memory 48") and a processor 50 capable of executing instructions stored thereon. The memory 48 and processor 50 are coupled together by a bus which communicates data there between. Computer 38 operates in accordance with software (which may be stored on external non-transient information storage medium 40 and/or the memory 48) and user input via an input device 42 to process and decode the received signals. The resulting telemetry data may be further analyzed and processed by a processor 50 of computer 38 to generate a display of useful information on a computer monitor 44 or some other form of a display unit. For example, an operator could employ this system to obtain and monitor drilling parameters or formation properties.

Although not explicitly shown in FIG. 1, it will be recognized that computer 38 may be connected to one or more public and/or private networks via one or more appropriate network connections. Moreover, those ordinarily skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media, including any known memory storage devices. The present invention may therefore, be implemented in connection with various hardware, software or a combination thereof in a computer system or other processing system.

Still referring to FIG. 1, in at least some embodiments, a portion of wellbore 16 is cased. Memory 40, 48 of computer 38 includes a casing wear volume determination program which, when executed by processor 50, determines casing wear volume along the inner wall of the casing based upon the dynamic stretch of the tubular string. Thus, computer 38 may also be referred to as a "casing wear volume determination unit." The system determines, based on the elasticity of the inner string, the casing string wear volume as a function of position along the casing string (i.e., wear factor distribution), and may present the corresponding distributed casing wear volume to a user via a display unit, such as computer monitor 44.

As described herein, casing wear volume determination unit 38 applies a torque and drag model to calculate the dynamic stretch of the inner tubular string due to the elasticity of the tubular material, which is then applied by casing wear determination software. The addition of the torque and drag calculations provides accurate surge/swab effect calculations, based on tubular movement, corrected for elasticity effects. The resulting calculations are applied in a casing wear model to determine the position of the inner tubular string.

Furthermore, the torque and drag models are calibrated to actual conditions along the outer tubular string in real-time using survey, temperature, pressure and downhole tool data to calculate friction factors which are applied to determine casing wear volume. During drilling, drill string 8 comes into contact with the casing along borehole 16. As drill string 8 rotates during operation, a side force is applied to the casing string, friction is created between drill string 8 and the casing string, pressure and axial loading are applied to drill string 8, and there is a defined temperature at the various contact points—all of which have a singular and combined effect on the dynamic stretch of drill string 8 over time. As discussed herein, illustrative methods of the present disclosure accounts for such phenomena in the form of elasticity, which is ultimately used to determine the casing wear volume.

With continued reference to FIG. 1, the torque and drag model forms part of casing wear volume determination unit 38. The torque and drag model performs wellbore pressure calculations caused by movement of drill string 8 inside borehole 16 based on an analysis of fluid flow and motion of drill string 8. In certain illustrative embodiments, the torque and drag model solves the full balance of mass and balance of momentum for drill string 8 and flow in annulus 9, while taking into consideration the compressibility of the drilling fluid, the elasticity of drill string 8, and the dynamic motions of drill string 8 and the drilling fluid. Also considered are surge pressures related to fluid column length below the moving drill string 8 and compressibility of the formation being drilled. Moreover, in other embodiments, fluid properties may be adjusted to reflect the effects of pressure and temperature on the drilling fluids.

The torque and drag model calculations are divided into two regions: the upper region from the surface of borehole 16 to the downhole end of drill string 8, and the interval from the downhole end of drill string 8 to bottom of borehole 16. In the upper region, pressure experienced by drill string 8 along the axial length thereof may be coupled to annulus pressures through the radial elasticity of drill string 8. In certain illustrative methods, the axial dynamic response of drill string 8 is given by the following set of equations:

$$\text{Momentum Equation: } \rho A \frac{\delta v}{\delta t} = \frac{\delta F}{\delta x}, \quad \text{Eq.(1)}$$

$$\text{linear elasticity Equation: } \frac{\delta F}{\delta T} = A \times E \frac{\delta v}{\delta x}, \quad \text{Eq.(2)}$$

$$\text{Bulk Modulus of Elasticity: } K = -\frac{dp}{\frac{dV}{V}} = \frac{dp}{\frac{d\rho}{\rho}}, \quad \text{Eq.(3)}$$

where, v=surface velocity of the drill string; $\rho$=density of the drilling fluid; A=cross-sectional area of the drill string; E=Young's modulus of the drill string; x=length of the wellbore; F=axial frictional force being exerted on the drill string in the wellbore; and t=time (at which the drill string starts moving). The expansion of the drill string is considered as:

$$\frac{1}{A}\frac{\delta A}{\delta P} = \frac{2}{E}\left|\frac{r_2^2 + r_1^2 + \mu(r_2^2 + r_1^2)}{r_2^2 - r_1^2}\right|, \quad \text{Eq. (4)}$$

where, A=cross-sectional area of the drill string; $r_2$=outer radius of the drill string; $r_1$=inner radius of the drill string; and $\mu$=viscosity of the drilling fluid. Equations 1-4 are solved to calculate the forces acting on drill string 8. Methods, such as, for example, the Bergeron method, finite element method (Galerkin procedure), or interpolated method of characteristics can be used to solve for the dynamic stretch and corresponding positions along the casing, as will be understood by those ordinarily skilled in the art having the benefit of this disclosure.

Because of the elasticity of drill string 8 and the pressure experienced by drill string 8 along the axial length thereof, drill string 8 may expand and contract in borehole 16. Due to the expansion and contraction of drill string 8 in borehole 16, the cross-sectional area of drill string 8 and the cross-sectional area of annulus 9 may vary. Consequently, this may result in a change in the pressure of the drilling fluid, which may further result in a change in the length of drill string 8.

In certain illustrative methods, the torque and drag model may also consider the effect of wellbore deviation and drill pipe eccentricity. In situations where casing is run in a wellbore with small annular clearances, the torque and drag model may take into account the frictional force experience by drill string 8 during motion. The drilling fluid movement and the pressure losses in an eccentric annulus are different from those in a concentric annulus. Excluding the frictional forces from the torque and drag model may underestimate the axial force on drill string 8, which may result in incorrect casing wear calculations.

Figure 2A:
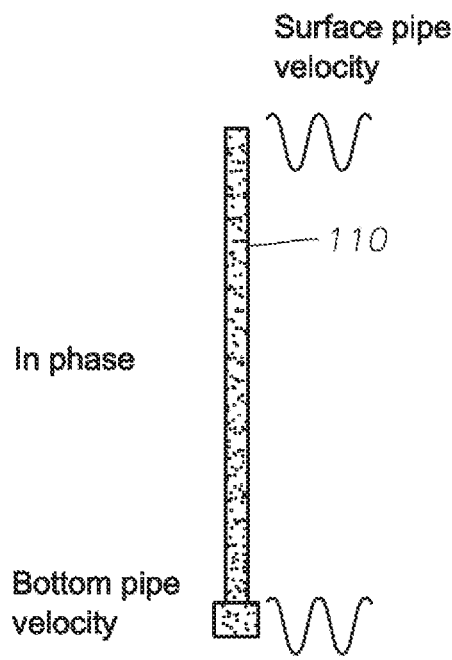
FIG. 2A illustrates the surface velocity of the drill string and the bottom velocity of the drill string in phase with each other.
Figure 2B:
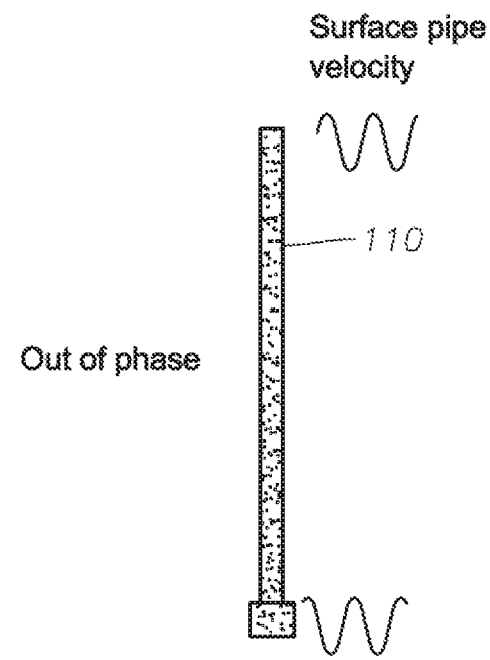
FIG. 2B illustrates the surface velocity of the drill string and the bottom velocity of the drill string as out of phase with each other.

Furthermore, the torque and drag model takes into account the elasticity of drill string 8 under different combinations of heave (due to sea waves) and drill string velocities, as illustrated in FIGS. 2A-2G. The depicted illustrative sinusoidal waves represent the velocities of drill string 8 and heave at the uphole and downhole ends of drill string 8, and are purely for the sake of explanation. FIG. 2A illustrates the surface velocity of drill string 8 (also referred to as a pipe or tubular in FIGS. 2A-2G) and the bottom velocity of drill string 8 in phase with each other. In other words, when the end of drill string 8 above the surface goes up, the end of drill string 8 in the borehole 16 also goes up, and vice-versa. FIG. 2B illustrates the surface velocity of drill string 8 and the bottom velocity of drill string 8 as out of phase with each other. In other words, the end of drill string 8 above the surface does not follow the end of drill string 8 in the borehole 16.

Figure 2C:
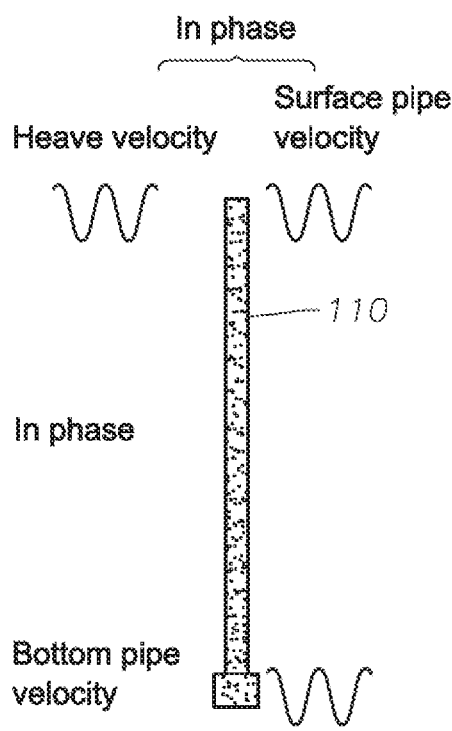
FIG. 2C illustrates the heave velocity, the surface velocity of the drill string, and the bottom velocity of the drill string in phase with each other.
Figure 2D:
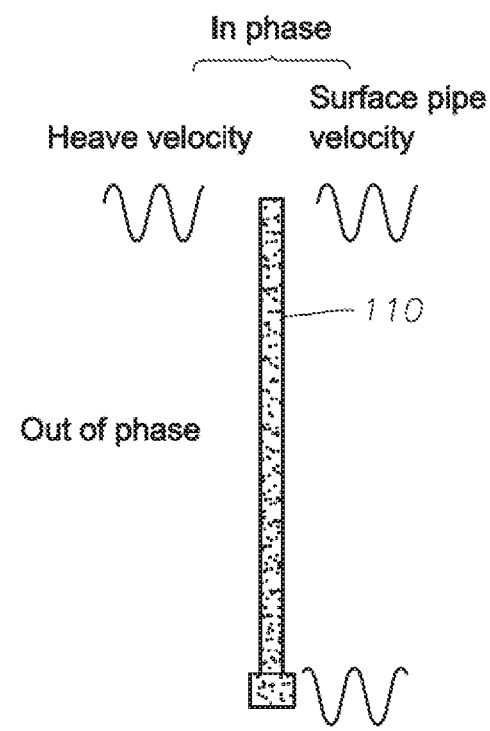
FIG. 2D illustrates the heave velocity and the surface velocity of the drill string are in phase with each other, while the bottom velocity of the drill string is out of phase with both the heave velocity and the surface velocity of the drill string.
Figure 2E:
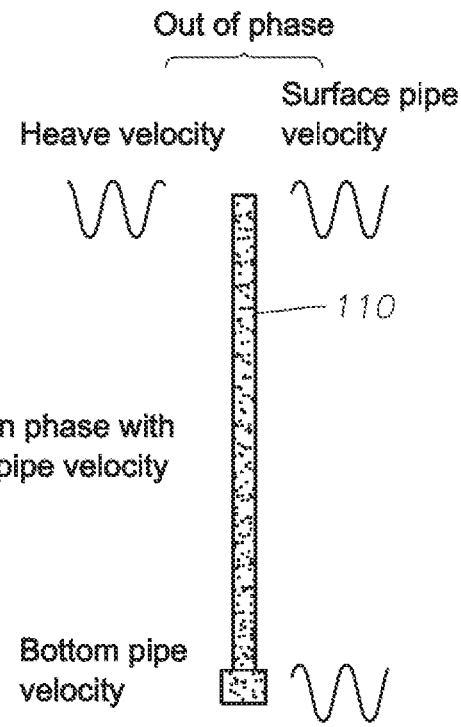
FIG. 2E illustrates the heave velocity and the surface velocity of the drill string being out of phase with each other, and the bottom velocity of the drill string is in phase with the surface velocity of the drill string.
Figure 2F:
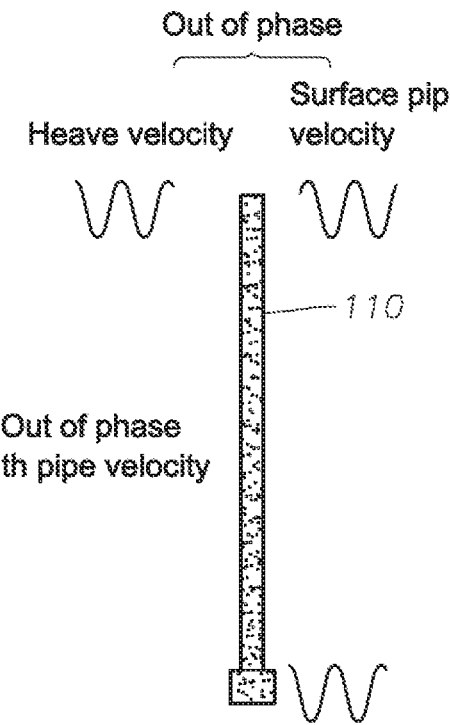
FIG. 2F illustrates the heave velocity and the surface velocity of the drill string being out of phase with each other, and the bottom velocity of the drill string is out of phase with the surface velocity of the drill string, and in phase with the heave velocity.
Figure 2G:
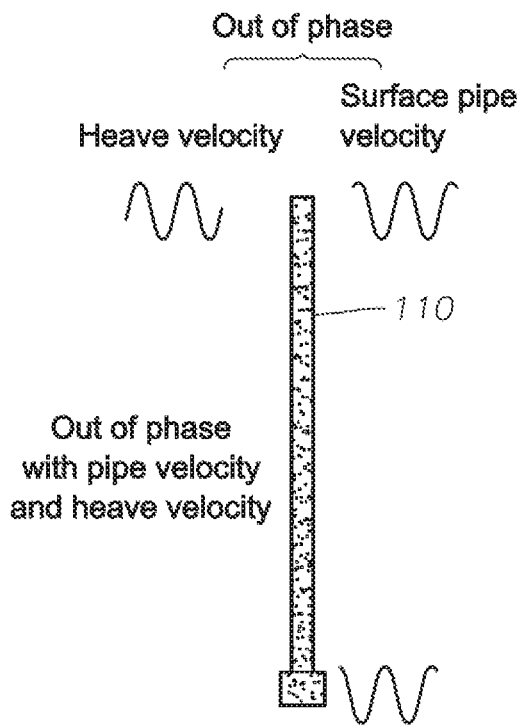
FIG. 2G illustrates the heave velocity and the surface velocity of the drill string being out of phase with each other, and the bottom velocity of the drill string is out of phase with both the heave velocity and the surface velocity of the drill string.

FIG. 2C illustrates the heave velocity (e.g., the velocity of the sea waves), the surface velocity of drill string 8, and the bottom velocity of drill string 8 in phase with each other. In FIG. 2D, the heave velocity and the surface velocity of drill string 8 are in phase with each other, while the bottom velocity of drill string 8 is out of phase with both the heave velocity and the surface velocity of drill string 8. In FIG. 2E, the heave velocity and the surface velocity of drill string 8 are out of phase with each other, and the bottom velocity of drill string 8 is in phase with the surface velocity of drill string 8. In FIG. 2F, the heave velocity and the surface velocity of drill string 8 are out of phase with each other, and the bottom velocity of drill string 8 is out of phase with the surface velocity of drill string 8, and in phase with the heave velocity. Finally, in FIG. 2G, the heave velocity and the surface velocity of drill string 8 are out of phase with each other, and the bottom velocity of drill string 8 is out of phase with both the heave velocity and the surface velocity of drill string 8.

As seen, due to the elasticity of drill string 8, the end of drill string 8 in borehole 16 may not always follow (or be in synchronization with) the end of drill string 8 above the well surface, thus resulting in a dynamic stretch. The elasticity of drill string 8 may result in different $P_{swab}$ and $P_{surge}$ pressures at different locations in borehole 16. For instance, while the end of drill string 8 above the surface in borehole 16 may be going up (or swabbing), the end of drill string 8 in borehole 16 may be going down (or surging). This may result in a $P_{swab}$ pressure at or adjacent the surface of borehole 16 and a $P_{surge}$ pressure at or adjacent the bottom of borehole 16. Additionally, drill string 8 may be swabbing or surging at one or more locations between the surface and the bottom of borehole 16 resulting in different $P_{swab}$ and $P_{surge}$ pressures at those locations, thus resulting in even more dynamic stretching.

Moreover, as the real-time density and rheological properties of the drilling fluid, the compressibility of the drilling fluid, downhole temperature and pressure, and/or the dynamic motions of drill string 8 and the drilling fluid change, they are detected by downhole sensors (not shown) and the new values are inputted into casing wear volume determination unit 38. The downhole sensors (also referred to as measuring devices) may form part of drill string 8 or, alternatively, may be otherwise deployed along borehole 16. There is a continual two-way transfer of data and information between the sensors and casing wear volume determination unit 38 so that the torque/drag and casing wear models are continuously calibrated to actual wellbore conditions. As a result, the dynamic stretch of drill string 8 is continuously updated in real-time to thereby provide the most current casing wear data (in those applications in which real-time operations are being conducted).

Accordingly, through use of the torque and drag model, casing wear volume determination unit 38 calculates the dynamic stretch of drill string 8 to thereby more accurately determine the position of casing wear along borehole 16 (note the short casing shown in FIG. 1 is only illustrative in nature, as all or a portion of borehole 16 may be cased). Once the elastic condition of drill string 8 is known (e.g., the conditions shown in FIGS. 2A-2G), the position of drill string 8 at different depths can be calculated by using the equations discussed above. Once the position is determined, the casing wear volume along the casing in borehole 16 is determined.

Figure 3:
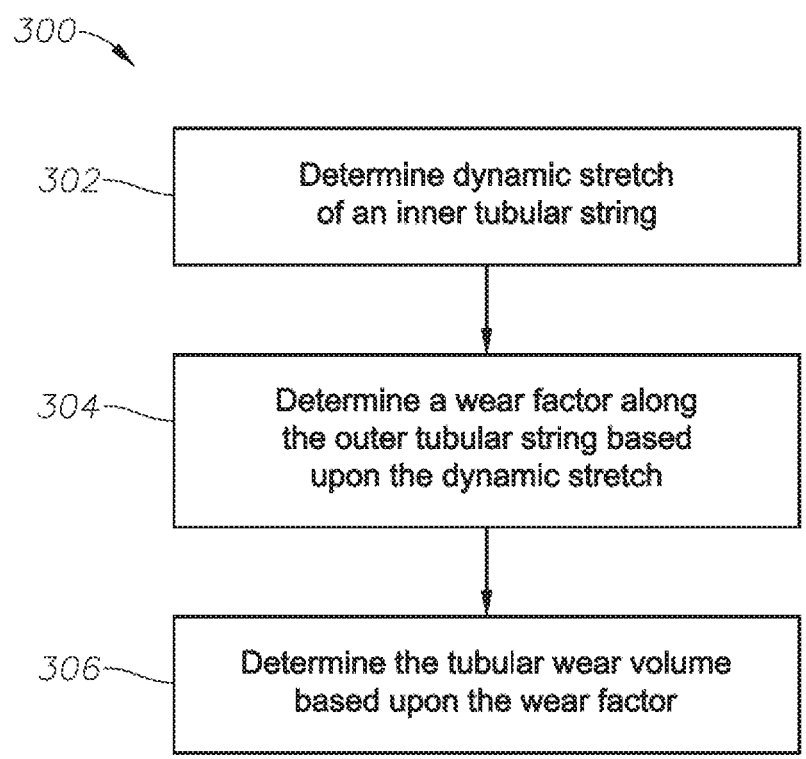
FIG. 3 is a flow chart of a tubular wear volume method, according to certain illustrative methods of the present disclosure.

FIG. 3 is a flow chart of an illustrative tubular wear volume method 300 of the present disclosure. The method 300 may be implemented by a computer system having a program stored on a non-transient computer readable medium and executed by a processor to determine the tubular wear volume using elasticity, such as the computer 38, memory 48, and processor 50 described above in FIG. 1. At block 302, the dynamic stretch of the inner tubular string (positioned inside an outer tubular string) is determined by the processor using the calculations described above. As previously discussed, the dynamic stretch is based upon the elasticity of the tubular material. The elasticity is determined for a selected operation, such as, for example, a drilling or pull-out operation. In this example, the dynamic stretch may be calculated first at depth 0, or at any depth, in which the processor determines the change in length of the inner tubular pipe. Once the length displacement is determined, the correct position at which to calculate casing wear is known, and this process may iteratively continue for all depths along the casing.

At block 304, using the dynamic stretch, a wear factor is determined at the correct position along the casing string determined at block 302. The wear factor is a function of the side force from the drill string components and rotation of the drill string, as will be understood by those ordinarily skilled in the art having the benefit of this disclosure. In certain methods, the wear factor may be a static number, while in other methods the wear factor may be determined based upon one or more other phenomena such as, for example, friction or temperature.

At block 306, the tubular wear volume is determined using the wear factor. In certain illustrative methods, the casing wear volume is given as:

$$V = \frac{\eta}{H_b} \int \mu F_n L dl = f_w \int \mu F_n L dl, \qquad \text{Eq. (5)}$$

where V=casing wear volume (volume of metal removed by wear in $m^3$; $\eta$ is wear efficiency; $H_b$ is casing Brinell hardness; $\mu$ is the friction factor; $F_n$ is the side force factor; L is distance slid (which can be fixed or take elasticity as function of time into account); dl is differential element length (which may also take elasticity into account); and $f_w$ is the wear factor determined at the correct position using the elasticity. Further application of Equation 5 will not be provided herein, as would be readily understood by those ordinarily skilled in the art having the benefit of this disclosure.

Once the casing wear volume is determined at the corrected position along the casing, the processor then determines the next depth at which to determine casing wear. These depth increments may be defined as desired, such as, for example, every foot, 3 feet, etc. If the processor determines there are more depths to investigate, the method loops back to block 302 where the process is conducted again at that depth. This continues iteratively until the casing wear is modeled at all desired positions along the casing string, in which the positions are determined using elasticity. Once the casing wear is determined for the first operation, further operations may be selected and its corresponding casing wear determined.

Thereafter, in certain embodiments, the determined casing wear volume may be integrated into a model based upon the operation and rotation of the drill string. A wear factor distribution (or casing wear volume distribution, for example) may then be generated and displayed by the system. For example, at various contact points along the casing string, the wear volume may be determined using various modeling techniques. Thereafter, the system may store or display the distributed casing wear volumes in graphical form or otherwise on a display unit.

The methods described herein may be applied in the planning stages of a wellbore, during a real-time operation, or during post operation analysis. If used in the planning stage, a drill string may be designed based upon the casing wear volume analysis. If used in real-time, a drill string operation may be altered based upon the wear volume calculations. In such applications, for example, as the drill string moves along the borehole, the wear may be continually adjusted based on the real time application of the elasticity. If used in post analysis, future operations or workstrings may be designed based upon the wear volume data.

Accordingly, the illustrative embodiments described herein provide accurate determination of casing wear volume by accounting for tubular elasticity. By considering the effects of dynamic stretch caused by tubular elasticity, casing wear is predicted with improved accuracy because the position of survey/contact points is correctly determined. The resulting improved wear distribution obtained for a given operation will help to reduce the wear by optimizing the drill string design and replacing components that cause maximum wear. Moreover, the improved casing wear determination will reduce over designing the casing, prevent failures, and save costs.

Embodiments of the present disclosure described herein further relate to any one or more of the following paragraphs:

1. A method for determining tubular wear volume, the method comprising determining a dynamic stretch of an inner tubular string positioned inside an outer tubular string, wherein the dynamic stretch is due to an elasticity of the inner tubular string; determining a wear factor along the outer tubular string based upon the dynamic stretch; and determining the tubular wear volume based upon the wear factor.

2. A method as defined in paragraph 1, wherein a torque and drag model is applied to determine the dynamic stretch.

3. A method as defined in paragraphs 1 or 2, wherein determining the dynamic stretch comprises calculating a surge pressure and swab pressure, the surge and swab pressure being based on movement of the inner tubular string in accordance with the dynamic stretch.

4. A method as defined in any of paragraphs 1-3, further comprising calibrating the torque and drag model to actual conditions along the outer tubular string using real-time data.

5. A method as defined in any of paragraphs 1-4, wherein the inner tubular string is a drill string; the outer tubular string is a casing string extending along a wellbore; and calibrating the torque and drag model further comprises obtaining the real-time data from the wellbore, the data including survey, temperature, pressure or downhole tool data.

6. A method as defined in any of paragraphs 1-5, further comprising obtaining the data with one or more downhole measuring devices.

7. A method as defined in any of paragraphs 1-6, further comprising designing a drill string based upon the tubular wear volume.

8. A method as defined in any of paragraphs 1-7, further comprising adjusting a drilling operation in real-time based upon the tubular wear volume.

9. A method as defined in any of paragraphs 1-8, wherein the outer tubular string is a casing string or riser.

10. A method for determining tubular wear volume, the method comprising calculating a dynamic stretch of an inner tubular string positioned inside an outer tubular string to thereby determine the tubular wear volume.

11. A method as defined in paragraph 10, wherein a torque and drag model is applied to determine the dynamic stretch.

12. A method as defined in paragraphs 10 or 11, wherein determining the dynamic stretch comprises calculating a surge pressure and swab pressure, the surge and swab pressure being based on movement of the inner tubular string in accordance with the dynamic stretch.

13. A method as defined in any of paragraphs 10-12, further comprising calibrating the torque and drag model to actual conditions along the outer tubular string using real-time data.

14. A method as defined in any of paragraphs 10-13, further comprising designing a drill string based upon the tubular wear volume.

15. A method as defined in any of paragraphs 10-14, further comprising adjusting a drilling operation in real-time based upon the tubular wear volume.

16. A system comprising processing circuitry to implement any of the methods defined in paragraphs 1-15.

17. A non-transitory computer-readable storage medium having computer-readable instructions stored thereon, which when executed by at least one processor causes the processor to perform any of the methods defined in paragraphs 1-15.

18. A drilling system, comprising a drilling rig that drives a drill string inside a wellbore that is at least partially cased by a casing string; and a casing wear volume determination unit coupled to the drilling rig to receive drilling parameters and responsively perform any of the methods defined in paragraphs 1-15.

19. A casing wear volume determination unit comprising processing circuitry to implement any of the methods defined in paragraphs 1-15

Moreover, the foregoing paragraphs and other methods described herein may be embodied within a system comprising processing circuitry to implement any of the methods, or a in a non-transitory computer-program product comprising instructions which, when executed by at least one processor, causes the processor to perform any of the methods described herein.

Although various embodiments and methods have been shown and described, the present disclosure is not limited to such embodiments and methodologies and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A method for determining tubular wear volume, the method comprising:
   determining a dynamic stretch of an inner tubular string positioned inside an outer tubular string, wherein the dynamic stretch is due to an elasticity of the inner tubular string;
   determining a wear factor along the outer tubular string based upon the dynamic stretch;
   determining the tubular wear volume based upon the wear factor, the tubular wear volume being a volume of tubular material removed by wear; and
   conducting a wellbore operation using the tubular wear volume.

2. The method as defined in claim 1, wherein a torque and drag model is applied to determine the dynamic stretch.

3. The method as defined in claim 2, further comprising calibrating the torque and drag model to actual conditions along the outer tubular string using real-time data.

4. The method as defined in claim 3, wherein:
   the inner tubular string is a drill string;
   the outer tubular string is a casing string extending along a wellbore; and
   calibrating the torque and drag model further comprises obtaining the real-time data from the wellbore, the data including survey, temperature, pressure or downhole tool data.

5. The method as defined in claim 4, further comprising obtaining the data with one or more downhole measuring devices.

6. The method as defined in claim 1, wherein determining the dynamic stretch comprises calculating a surge pressure and swab pressure, the surge and swab pressure being based on movement of the inner tubular string in accordance with the dynamic stretch.

7. The method as defined in claim 1, further comprising designing a drill string based upon the tubular wear volume.

8. The method as defined in claim 1, further comprising adjusting a drilling operation in real-time based upon the tubular wear volume.

9. The method as defined in claim 1, wherein the outer tubular string is a casing string or riser.

10. A method for determining tubular wear volume, the method comprising:
   calculating a dynamic stretch of an inner tubular string positioned inside an outer tubular string to thereby determine the tubular wear volume, wherein the tubular wear volume is a volume of tubular material removed by wear; and
   conducting a wellbore operation using the tubular wear volume.

11. The method as defined in claim 10, wherein a torque and drag model is applied to determine the dynamic stretch.

12. The method as defined in claim 11, further comprising calibrating the torque and drag model to actual conditions along the outer tubular string using real-time data.

13. The method as defined in claim 10, wherein determining the dynamic stretch comprises calculating a surge pressure and swab pressure, the surge and swab pressure being based on movement of the inner tubular string in accordance with the dynamic stretch.

14. The method as defined in claim 10, further comprising designing a drill string based upon the tubular wear volume.

15. The method as defined in claim 10, further comprising adjusting a drilling operation in real-time based upon the tubular wear volume.

16. A system comprising processing circuitry to implement the method comprising:
   calculating a dynamic stretch of an inner tubular string positioned inside an outer tubular string to thereby determine the tubular wear volume, wherein the tubular wear volume is a volume of tubular material removed by wear; and
   conducting a wellbore operation using the tubular wear volume.

17. The method as defined in claim 16, wherein a torque and drag model is applied to determine the dynamic stretch.

18. The method as defined in claim 16, wherein determining the dynamic stretch comprises calculating a surge pressure and swab pressure, the surge and swab pressure being based on movement of the inner tubular string in accordance with the dynamic stretch.

19. The method as defined in claim 18, further comprising calibrating the torque and drag model to actual conditions along the outer tubular string using real-time data.

20. The method as defined in claim 16, further comprising designing a drill string based upon the tubular wear volume.

21. The method as defined in claim 16, further comprising adjusting a drilling operation in real-time based upon the tubular wear volume.

22. A non-transitory computer-readable storage medium having computer-readable instructions stored thereon, which when executed by at least one processor causes the processor to perform the method comprising:
   calculating a dynamic stretch of an inner tubular string positioned inside an outer tubular string to thereby determine the tubular wear volume, wherein the tubular wear volume is a volume of tubular material removed by wear; and
   conducting a wellbore operation using the tubular wear volume.

23. The computer readable storage medium as defined in claim 22, wherein a torque and drag model is applied to determine the dynamic stretch.

24. The computer readable storage medium as defined in claim 22, wherein determining the dynamic stretch comprises calculating a surge pressure and swab pressure, the surge and swab pressure being based on movement of the inner tubular string in accordance with the dynamic stretch.

25. The computer readable storage medium as defined in claim 24, further comprising calibrating the torque and drag model to actual conditions along the outer tubular string using real-time data.

26. The computer readable storage medium as defined in claim 22, further comprising designing a drill string based upon the tubular wear volume.

27. The computer readable storage medium as defined in claim 22, further comprising adjusting a drilling operation in real-time based upon the tubular wear volume.

28. A drilling method, comprising:
   calculating a dynamic stretch of an inner tubular string positioned inside an outer tubular string to thereby determine a tubular wear volume, wherein the tubular wear volume is a volume of tubular material removed by wear; and
   adjusting a drilling operation based upon the tubular wear volume.

* * * * *